March 8, 1938.  R. R. BUSH  2,110,658

OPERATING MECHANISM

Filed Sept. 20, 1935

Inventor:
Ralph R. Bush,
by Harry E. Dunham
His Attorney.

Patented Mar. 8, 1938

2,110,658

UNITED STATES PATENT OFFICE 2,110,658

OPERATING MECHANISM

Ralph R. Bush, Manoa, Upper Darby, Pa., assignor to General Electric Company, a corporation of New York Application September 20, 1935, Serial No. 41,505

8 Claims. (Cl. 175—341)

My invention relates to operating mechanisms, more particularly to trip-free mechanisms of the solenoid-operated type, and has for its principal object the provision of improved mechanism of the aforesaid type which shall be comparatively simple and rugged in construction and efficient, reliable and positive in operation.

My invention will be more fully set forth in the following description referring to the accompanying drawing, and the features of novelty which characterize my invention will be pointed out with particularity in the claims annexed to and forming a part of this specification.

Figure 1:
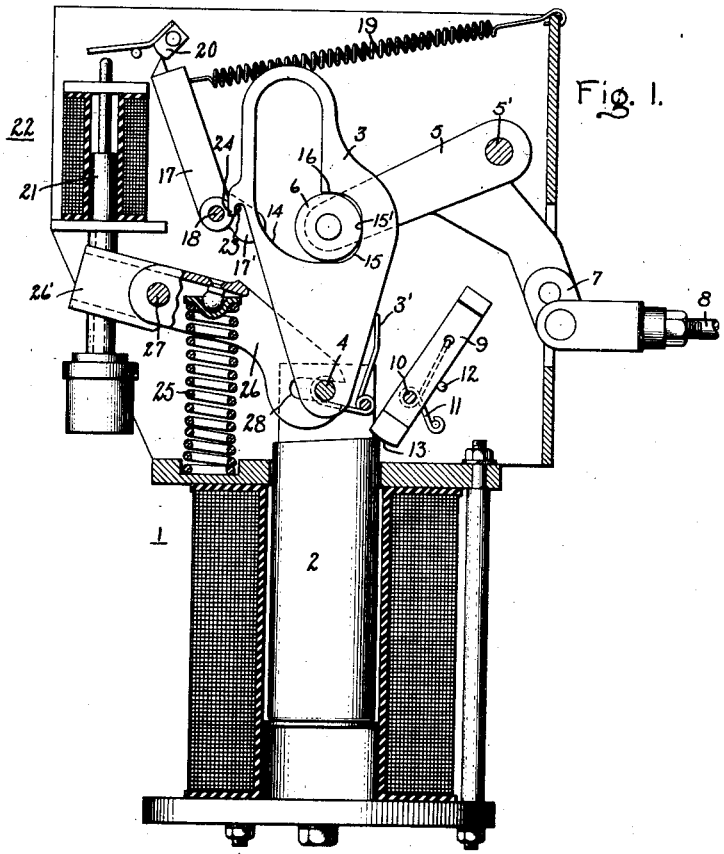
Figure 2:
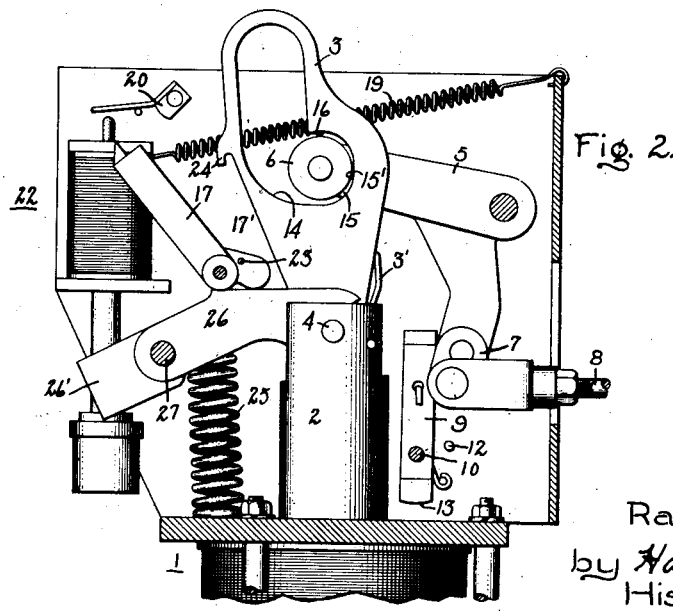

Referring to the drawing, Fig. 1 is an elevational view, partly in section, of a solenoid-operated mechanism in actuated or closed position embodying my invention, and Fig. 2 is a similar view illustrating the mechanism in the tripped and reset position prior to the operating stroke of the solenoid.

The mechanism illustrated in Fig. 1 comprises suitable actuating means, such as a solenoid 1 having an operating plunger 2, a main operating link 3 which is pivotally connected, as at 4, to one end of the solenoid plunger, and a crank 5 pivotally mounted at 5', one arm of which coacts through a roller 6 with the link 3 and the other arm through an interconnecting link 7 to the means to be actuated at 8. The rod 5 in the present instance can be connected to a circuit breaker (not shown), the operating mechanism in such cases closing the breaker, and tripping or release of the mechanism causing opening of the breaker.

As illustrated, the mechanism is in the actuated and restrained position and is held in such position by a prop 9 pivotally mounted on the mechanism frame at 10 and biased by a spring 11 in clockwise direction against a stop 12 so as to abut at its lower end at 13 a shoulder of the solenoid plunger 2. With the main operating link 3 in the position shown, the crank 5 is restrained with respect to clockwise rotation or opening movement.

Referring more particularly to the coaction between the link 3 and crank 5, the link 3 is provided with an interior cam surface 14 which is formed by cutting away a portion of the link 3 and which is engaged by the crank roller 6. The surface 14 forms a pocket 15 in the link, one surface 16 of which is so designed that when engaged by the roller 6, crank 5 is restrained from rotating clockwise in the position shown.

The shape of the cam surface defined by the main link 3 serves several purposes. For latching the surface 16 is ground about the center of pin 4 so that there is perfect rolling action during the entire tripping cycle. That is, the surface 16 is tangential to the radius from the link pivot 4 so that when the plunger 2 and link 3 are restrained by the prop 9, the roller 6 cannot move in vertical direction. Once tripped, the roller 6 is forced by opening of the breaker to roll up the curved surface 14. This same curved surface assists in resetting of the link with minimum shock when the link is raised. The surface 15 is also circular shaped so as to reduce shock during resetting. A radius very nearly equal to the radius of the roller blends the long radius of surface 14 into the roller stop surface 15', thereby further reducing the shock of resetting. The material in the link is distributed so as to give maximum strength and even distribution of stress with a minimum moment of inertia.

For the purpose of tripping the mechanism through the link 3 and permitting clockwise rotation of crank 5, a trip hammer 17, pivoted at 18, is connected to a tension spring 19 which is held under tension by a latch 20. When the latch 20 is released, such as by actuation of the plunger 21 of a tripping solenoid 22, the spring 19 snaps the trip hammer 17 in clockwise direction with such force that when the hammer engages the link 3 the latter is moved clockwise by the impact to a position where the roller 6 is no longer restrained by the surface 16. The crank 5 is then free to rotate clockwise, the roller 6 moving into the upper portion of the link 3.

In order to minimize the possibility of accidental tripping due to vibration or other causes, the trip hammer 17 is provided at 23 with a pin or the like which in the latched position lies beneath a lug or extension 24, forming part of the link 3, so as to prevent clockwise movement of the link 3. That is, when the trip hammer is latched the main link 3 is likewise latched. However, it will be noted that the pin 23 moves clear of the lug 24 to unlatch link 3 when the hammer is rotated clockwise by its spring for tripping the mechanism.

The resetting means for the mechanism will be clearly understood by further reference to Fig. 2. When the crank 5 rotates clockwise during the tripping or opening operation, crank arm 7, in moving towards the left, engages the prop 9 so as to rotate the prop against the bias of its spring to the vertical position, releasing the solenoid plunger 2. The plunger is then raised by a compression spring 25 which is compressed during the closing stroke of the mechanism. The spring 25 is connected to the plunger by an arm 26, which is pivoted at 27, and provided with a bifurcated extension 28 for engaging the pin 4. The arm 26 may likewise be provided with an extension 26' for cooperation with a bar so that the mechanism may be manually operated.

In addition to raising the solenoid plunger for another operating stroke, the tensioned spring 25 lifts the link 3, as illustrated by Fig. 2, so as to reset the roller 6 in the pocket 15. As previously described, the cam surfaces of link 3 coact with roller 6 so that there is a minimum shock during this operation. This link resetting operation is further aided by a light spring 3' tending to bias the link 3 counterclockwise so that the stop surface 15' engages roller 6.

The arm 26 likewise causes resetting of the trip hammer 17 by reason of the engagement of the arm and the extension 17' of the trip hammer. This not only causes counterclockwise rotation of the hammer 17 for positioning it in front of the latch 20 but also places the spring 19 under tension for another tripping operation.

The mechanism illustrated in Fig. 2 is, therefore, in readiness for a reclosing operation which is effected by energization of the solenoid 1, causing downward movement of the plunger 2 and link 3. Engagement of the tangential surface 16 and roller 6 causes upon further movement of the plunger counterclockwise rotation of the crank 5 for closing the circuit breaker, etc. As the plunger 2 is drawn within the solenoid coil, the arm 26 is rotated clockwise and the spring 25 compressed so that the hammer 17 is free to be pulled by the spring 19 into engagement with the latch 20, as illustrated in Fig. 1. As crank arm 7 moves towards the right away from the prop 9, the latter is biased by its spring 11 towards the plunger 2 so as to restrain the same when it reaches the end of its stroke.

It will be noted that the mechanism is trip-free during the main part of the operating stroke; that is, the tripping operation is effective immediately after the initial movement of the solenoid plunger 2 during which it resets the trip hammer 17 to release the crank 5 notwithstanding continued movement of the solenoid plunger 2 into the coil. Upon actuation of the latch 20, the impact trip functions to disengage the link 3 and crank 5 regardless of continued closing movement of the solenoid plunger.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States is:

1. Operating mechanism comprising actuating means and means to be actuated, an anti-friction member carried by one of said means, a link pivotally mounted on and carried by the other of said means for disengageably coacting with said member and interconnecting both the aforesaid means for effecting operation of said means to be actuated, releasing means other than said actuating means coacting with said link for causing reverse operation of said means to be actuated, and means for resetting said link with respect to said member in accordance with the operation of said means to be actuated.

2. Operating mechanism comprising solenoid actuating means and means to be actuated, a roller carried by one of said means, a link pivotally mounted on and carried by the other of said means having a slot including a recessed portion forming an interior cam surface for coacting with said roller, operation of said actuating means causing simultaneous movement of said link and roller to actuate said means to be actuated, releasing means other than said solenoid actuating means arranged to move said link and cam surface at said recessed portion with respect to said roller, and means for resetting said link with respect to said roller in accordance with the operation of said means to be actuated.

3. Operating mechanism comprising an operating solenoid, means to be actuated and a disengageable connection between the plunger of said solenoid and said means, and a prop biased so as to engage and restrain said plunger in the operated position thereof, said means to be actuated arranged so as to engage said prop and release said plunger in response to release of said disengageable connection.

4. Operating mechanism comprising actuating means and means to be actuated, a disengageable connection between the aforesaid means, a trip hammer for disengaging said connection and causing reverse movement of said means to be actuated, and a latching device positively interconnecting said trip hammer and connection in the operative restraining position thereof for preventing accidental disengagement of said connection, said latching device being arranged so as to free said connection only when said trip hammer is actuated.

5. Operating mechanism comprising an actuating solenoid and a crank, one arm of which carries a roller, an operating link pivotally connected to and carried by the plunger of said solenoid, said link having a cut-away portion including a pocket having a cam surface arranged to engage and restrain said roller so that actuation of said plunger causes rotation of said crank, a resiliently biased trip hammer arranged to engage said link so as to free said roller with respect to said cam surface thereby permitting reverse movement of said crank, electromagnetic tripping means for releasing said trip hammer, a spring arranged to be tensioned during the operating stroke of said plunger, means for releasing said spring in response to said reverse movement of said crank for resetting said plunger and link for another operation and for resetting said trip hammer, and means for resiliently biasing said link in said reset position so that said roller is received by said pocket.

6. Operating mechanism comprising actuating means and means to be actuated, a link arranged disengageably to connect the aforesaid means, tripping means coacting with said link for disengaging said connection, and separate latching means arranged positively to hold said link in connecting position, said latching means being released only by and in accordance with actuation of said tripping means.

7. Operating mechanism comprising actuating means and means to be actuated, a disengageable connection including a link between the aforesaid means, tripping means for causing movement of said link to a disengageable position, latching means between said tripping means and link for positively holding said link in connecting position until actuation of said tripping means, means holding said link in actuated position, said means arranged to be released in response to disengagement of said connection, and a spring coacting with said link and arranged to be tensioned during the operating stroke of said actuating means, said spring being effective upon release of said link to move said link to a reset position reestablishing said connection and likewise effective to reset said tripping means, the subsequent operating stroke of said link engaging the aforesaid latching means.

8. Operating mechanism comprising actuating means and means to be actuated, a link for disengageably connecting the aforesaid means pivotally mounted with respect to one of said means, and a roller operatively connected to the other of said means, said link having an elongated slot terminating at one end in a lateral pocket within which said roller operates, said slot and pocket forming a continuous cam surface, one side of said pocket forming a surface which is tangential to the radius from the point of the pivotal support of said link, the inner side of said pocket forming a stop surface for said roller, said stop surface merging into a surface of greater radius, and tripping means for moving said link with respect to said roller to disengage said connection, said roller during relative movement of said link and roller being in rolling engagement with the aforesaid tangential surface, said roller in the releasing position being out of said pocket and at the opposite end of said slot.

RALPH R. BUSH.